(12) United States Patent
Dooley et al.

(10) Patent No.: US 7,621,117 B2
(45) Date of Patent: Nov. 24, 2009

(54) APPARATUS AND METHOD FOR CONTROLLING ENGINE WINDMILLING

(75) Inventors: Kevin Allan Dooley, Mississauga (CA); William J. K. Savage, Milton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 520 days.

(21) Appl. No.: 11/425,012

(22) Filed: Jun. 19, 2006

(65) Prior Publication Data
US 2007/0289310 A1    Dec. 20, 2007

(51) Int. Cl.
*F02C 7/32* (2006.01)
*F02K 3/00* (2006.01)
*F02C 7/36* (2006.01)

(52) U.S. Cl. .......................... 60/226.1; 60/802; 60/793

(58) Field of Classification Search ................ 60/226.1, 60/801, 802, 792, 39.163, 793
See application file for complete search history.

(56) References Cited

U.S. PATENT DOCUMENTS

| | | | |
|---|---|---|---|
| 2,462,201 A * | 2/1949 | Kilgore et al. ................. | 244/60 |
| 2,860,713 A * | 11/1958 | Peterson ....................... | 60/786 |
| 3,759,467 A | 9/1973 | Roudil | |
| 3,779,665 A | 12/1973 | Tatem Jr. et al. | |
| 3,812,411 A | 5/1974 | Johnson et al. | |
| 4,062,185 A | 12/1977 | Snow | |
| 4,062,186 A | 12/1977 | Snow et al. | |
| 4,799,354 A | 1/1989 | Midgley | |
| 5,167,119 A | 12/1992 | Ward | |
| 5,349,814 A | 9/1994 | Ciokajlo et al. | |
| 5,430,362 A | 7/1995 | Carr et al. | |
| 5,694,765 A * | 12/1997 | Hield et al. ............... | 60/39.163 |
| 5,731,649 A * | 3/1998 | Caamano ..................... | 310/216 |
| 5,735,116 A | 4/1998 | Mouton | |
| 5,845,483 A | 12/1998 | Petrowicz | |
| 6,312,215 B1 | 11/2001 | Walker | |
| 6,467,725 B1 | 10/2002 | Coles et al. | |
| 6,784,565 B2 | 8/2004 | Wall et al. | |
| 6,960,900 B2 | 11/2005 | Fogarty et al. | |
| 2002/0189231 A1 | 12/2002 | Franchet et al. | |
| 2005/0135929 A1 | 6/2005 | Waddleton | |
| 2006/0137355 A1 | 6/2006 | Welch et al. | |
| 2006/0260323 A1 | 11/2006 | Moulebhar | |

FOREIGN PATENT DOCUMENTS

| EP | 1031717 A2 | 8/2000 |
|---|---|---|
| EP | 1367690 A2 | 12/2003 |

OTHER PUBLICATIONS

International Search Report, PCT/CA2007/000925, Aug. 16, 2007.

* cited by examiner

*Primary Examiner*—Ted Kim
(74) *Attorney, Agent, or Firm*—Ogilvy Renault LLP

(57) ABSTRACT

An apparatus and method are provided for controlling the ground windmilling of at least one of the spools in a gas turbine engine. Electrical power is supplied to a braking apparatus in one aspect. In another aspect, an oil system is powered during ground windmilling.

9 Claims, 3 Drawing Sheets

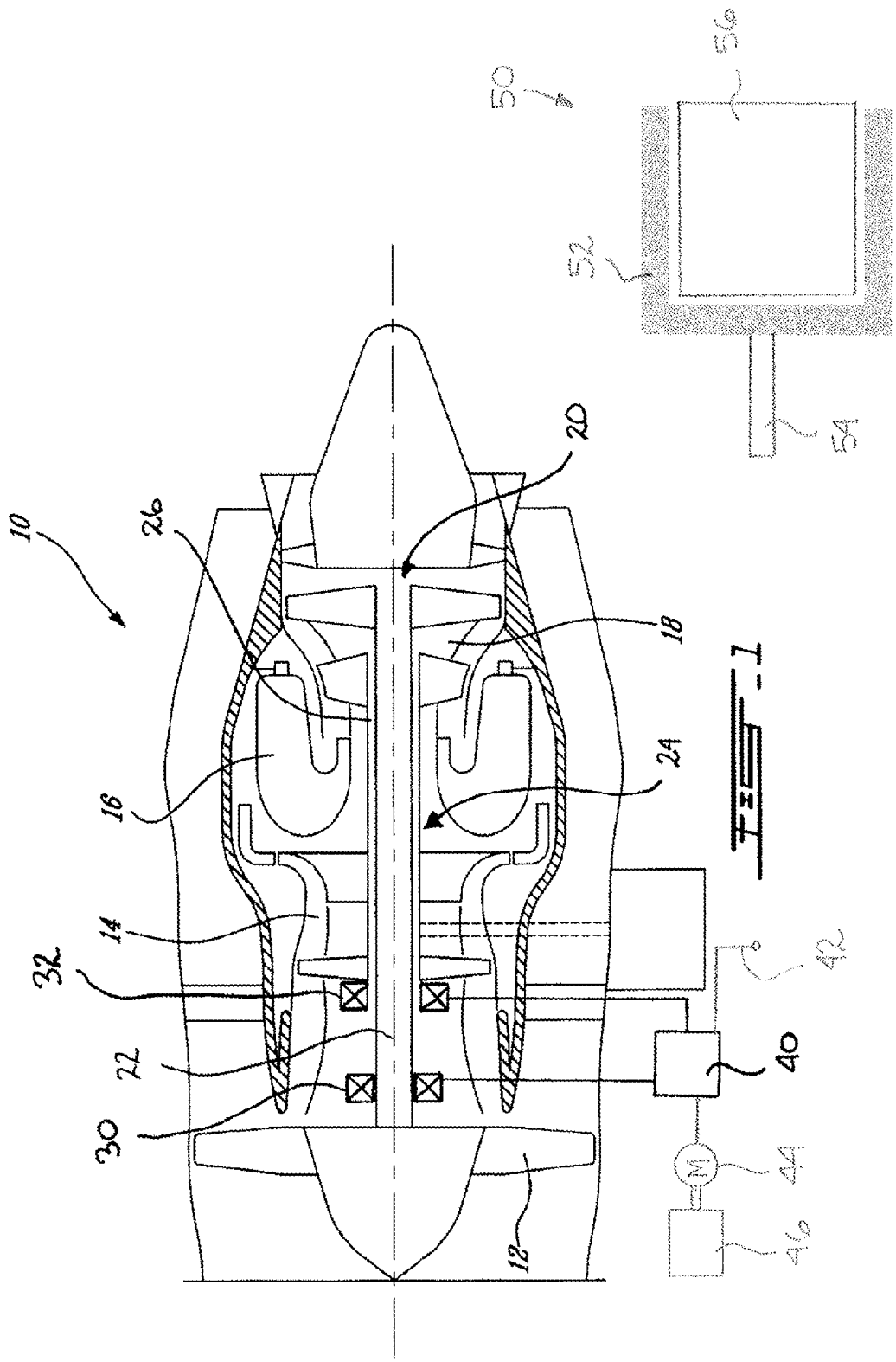

APPARATUS AND METHOD FOR CONTROLLING ENGINE WINDMILLING

TECHNICAL FIELD

The invention relates to the control of windmilling of a gas turbine engine.

BACKGROUND

When aircraft are parked in windy areas with their gas turbine engines shut down, windmilling of the turbine and compressor rotors of the engines may occur, particularly with turbofan engines. Windmilling in such circumstances, i.e. when the engines are not otherwise in operation, is generally undesired to avoid rotation speeds that could cause vibration issues and to avoid potentially long periods of rotation of the rotors when no lubricating oil is provided to the bearings. To alleviate this problem, it is often required that the aircraft be parked with the proper orientation to minimize the effect of prevailing winds or to install removable inlet and exhaust covers on the engines. There is room for improvement, however.

SUMMARY

In one aspect, the present concept includes a ground windmill control apparatus for a gas turbine engine having a plurality of shafts, each supporting bladed rotors, the apparatus comprising: at least one electric generator associated with at least one of the shafts; at least one electric motor associated with at least one of the shafts; a controller operable while the engine is in a shutdown mode to provide electrical power generated by the electric generator to apply a braking torque with the electric motor.

In another aspect, the present concept includes a method of impeding ground windmilling of a shaft in a gas turbine engine, the method comprising: shutting down the engine while the engine is on the ground; providing electrical power to an electric machine connected to the shaft; and braking the rotation of the shaft with the electric machine.

In another aspect, the present concept includes a method of controlling a gas turbine engine comprising the steps of: shutting down the engine, and then monitoring shaft rotation speed, and providing electricity to an electrically powered oil pump of the engine upon shaft rotation speed exceeding a threshold speed, the oil pump communicating with an oil system including at least one oiled bearing of the shaft.

In another aspect, the present concept includes a ground windmill control apparatus for a gas turbine engine having a plurality of shafts, each supporting bladed rotors, the apparatus comprising: at least one electric motor associated with at least one of the shafts; a controller operable while the engine is in a shutdown mode to provide electrical power to apply a braking torque with the electric motor.

BRIEF DESCRIPTION OF THE FIGURES

For a better understanding and to show more clearly how the present concept may be carried into effect, reference will now be made by way of example to the accompanying figures, in which:

FIG. 1 shows a schematic cross-sectional view of an example of a gas turbine engine employing the present concept;

FIG. 2 is a schematic axial cross-sectional view of an example of an electric machine that can be used in the present concept;

DETAILED DESCRIPTION

Figure 3:
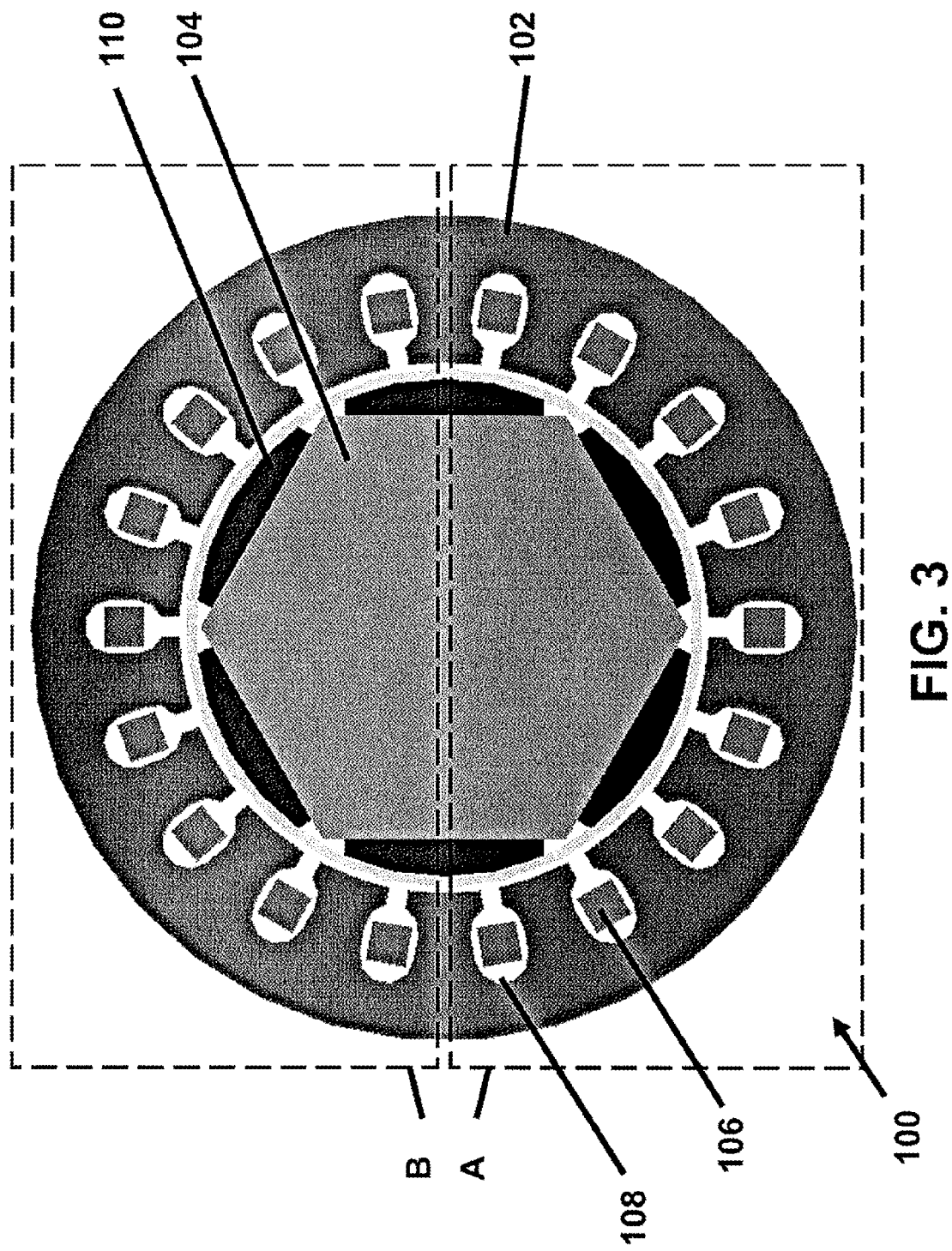
FIG. 3 is a schematic radial cross-sectional view of another example of an electric machine that can be used in the present concept.

FIG. 1 illustrates a gas turbine engine turbofan 10 of a type preferably provided for use in subsonic flights, generally comprising in serial flow communication a fan 12 through which ambient air is propelled, a compressor section 14 for pressurizing the air, a combustor section 16 in which the compressed air is mixed with fuel and ignited for generating a stream of hot combustion gases, and a turbine section 18 for extracting energy from the combustion gases.

In this case, the gas turbine engine 10 includes a low-pressure (LP) spool 20 having a shaft 22 to which are mounted the fan 12 and a low-pressure turbine or turbines. The illustrated gas turbine engine 10 also includes a high-pressure (HP) spool 24 having a shaft 26 to which are mounted a high-pressure compressor or compressors and a high-pressure turbine or turbines. In this example, a machine 30 operable as a generator, referred to herein as the low spool generator or LSG, is coaxially mounted on the LP spool 20, and a machine 32 operable as a starter-generator, referred to herein an integrated starter-generator or ISG, is coaxially mounted on the HP spool 24. LSG and ISG machines 30, 32 are preferably electric machines.

As shown in FIG. 1, the electric machines 30,32 are connected to a controller 40 which uses the electric power generated by the windmilling to apply a braking torque to either one or both of the spools 20, 24, thereby inhibiting windmilling as described further below.

Referring to FIG. 2, while LSG and ISG machines 30, 32 may have any suitable configuration, in this example both are preferably permanent magnet electric machines 50 having a rotor 52 mounted to a shaft 54 and thereby rotatably mounted adjacent to a stator 56. The shaft 54 represents spools 20, 24. The electric machines 50 will be understood to be operable as either a motor or a generator, or both, depending on the associated control provided.

When an aircraft is parked and the engines are shut down, air flow through the engine (such as wind) can induce rotation in the LP spool 20 of the engine 10, its HP spool 24, or both, particularly in a turbofan engine 10 which lacks an accessory gear box (AGB) since the inherent inertia provided by the AGB to impede rotation windmilling is absent. However, in the present system, electricity is supplied preferably to both LSG and ISG machines 30, 32 in an appropriate manner so as to electromagnetically brake or lock the machine rotors relative to their respective stators, to thereby impede casual windmilling rotation of the engine's spools.

In one aspect, upon such casually induced windmilling rotation of one of the spools, the associated electric machine 30, 32 will act as a generator in response to such rotation and generate electrical power which in this invention is applied specifically to the same or another machine 30, 32 to magnetically lock or brake the same spool or another spool. For instance, the ISG may comprise an electric machine having multiple channels, as will now be described with reference to FIG. 3.

FIG. 3 shows an example of an electric machine 100 having two independent channel sections which in essence provide two separately controllable machines, namely machine A and machine B, within the same stator 102. The rotor 104 is shown as being outside the stator 102, but it can be inside if desired. Briefly, the stator 102 has a plurality of stator windings 106 provided in slots 108 of stator 102. Permanent magnets 110 are provided on the rotor 104. The channels A, B comprise independent and separated sets of windings 106, and thus machine 100 has a two-in-one electric machine design. The windings of channel A are confined to the sector of the stator indicated as "A" in FIG. 3, while the windings of channel B are confined to the sector of the stator indicated as "B" in FIG. 3. The windings are independently operable by controller 40 (see FIG. 1), and preferably may be operated each in a motor and generator modes. For example, rotation of rotor 104 may be used to generate electricity in the windings 106 of channel A, while the windings of channel B are turned "off". Alternately, the windings of channel B may also be turned "on" and also used to generate electricity in tandem with the windings of channel A. Still alternately, and more relevant to the present example, the windings of channel B may be used in a motor or braking mode, driven by power generated by the windings of channel A, to impede rotation of rotor 104, as will be described further below. Machine 100 may thus be operated either as a generator or a motor, or both. Other than the presence of multiple redundant machines or channels, the design of machine 100 is not especially relevant to the apparatus and method described herein, and thus is described no further here.

Figure 4:
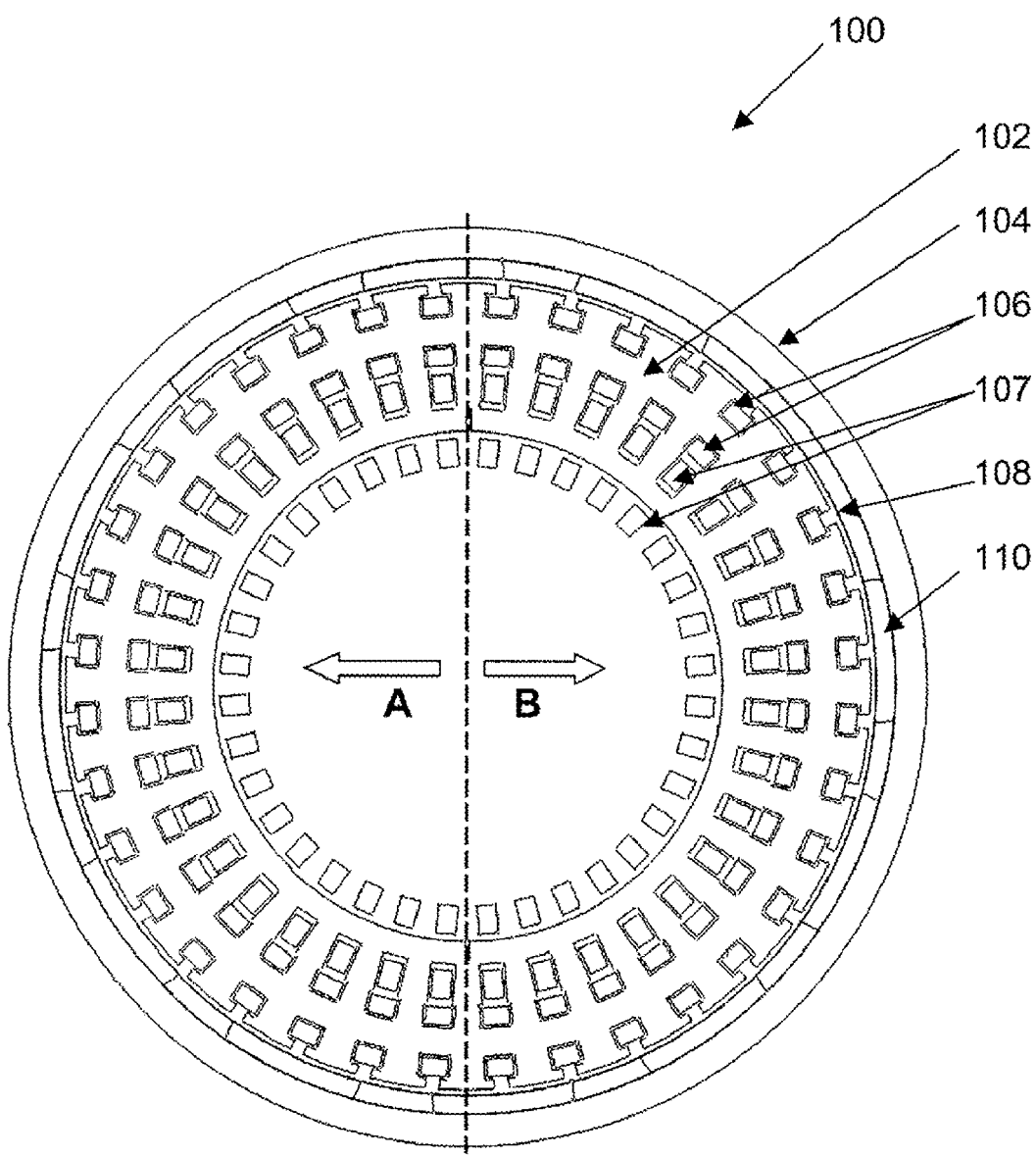
FIG. 4 is another schematic radial cross-sectional view of another example of an electric machine that can be used in the present concept.

Referring to FIG. 4, in another embodiment, machine 100 may have a more complex internal configuration, such as the one described in Applicant's co-pending U.S. patent application Ser. No. 10/996,411, published Jun. 1, 2006, incorporated herein by reference, which employs a stator 102 having power windings 106 and control windings 107 of the type described in that pending application. As described above, the stator is preferably conceptually divided into A and B halves, in each of which an independent set of windings 106, 107 are provided, to provide a controllable dual channel machine. The skilled reader will appreciate any suitable number of such channels may be provided and that two channels, while preferred and exemplary, are not required.

Referring back to FIG. 1, in one aspect the present concept preferably includes electric machines 30, 32 which each have preferably two independently controllable channels of the type described with respect to FIGS. 3, 4. As windmilling causes the machine rotor to rotate, one channel acts as a generator to supply current to the other channel, which is used as a motor or brake electrically driven by the generator channel, to impede or prevent rotation preferably by driving it in the opposite direction to the rotor rotation direction developed by the windmilling effect, to thereby counteract windmilling as quickly as possible, and preferably stop it. Alternately, the machine may be driven by a stationary current provided to the machine stator.

Alternately, rather than providing multi-channel machines, the "motor" and "generator" functions of the present concept can be provided by two different machines on separate spools, both machines cooperating to brake both spools since a drag torque is developed by the generator in the opposite direction to its rotation while torque in the motor is developed by the current supplied to it by the generator. The interconnections between the machines are configured electrically such that rotation of the motor would be opposite to its windmilling rotation direction, and these implicit torques can be used to impede windmill rotation.

Still alternately, or additionally if needed or desired, external power can be provided in place of instantaneously generated power, or can be added to the instantaneously generated power as desired, such as at a certain moment in the process, in order to achieve the desired stopping/braking action of the spools.

Therefore, comparing the alternatives described above, in one example, the controller 40 receives the electrical output generated by a first channel of the LSG machine 30 on the LP spool 20, and uses this electrical output to apply a braking torque to a second channel of the same LSG machine 30. A similar approach may be used with the ISH on the HP spool 24. In another example, the controller 40 directs the electrical power from LSG machine 30 to the ISG machine 32 of the HP spool 24, to cause ISG machine 32 to apply torque in the appropriate direction (relative to windmill rotation) to brake the rotation of the HP spool 24. At the same time, the generator action of LSG machine 30 creates rotational drag on the low spool 20, and hence the windmilling effect will be reduced in both spools 20, 24. In another example, external electrical power 42, such as electrical power coming from a battery or other energy storage device (e.g. capacitor(s), fuel cell(s), etc.) 42 in the aircraft or from a power source 42 on the ground, may be used to apply some or all of the braking torque to one or both machines 30, 32. In any of the above examples, the electrical power may also or instead be shared between different engines of a multiple engine aircraft (not shown). If desired, the windmill rotation speed can be monitored, for instance by the controller 40 using signals coming from the machines 30, 32, or from any appropriate sensors, in order to determine exactly when providing the electrical power is commenced and/or stopped. For instance, the windmill rotation speed can be compared to a predetermined rotation speed acting as a threshold for initiating and/or ending the supply of electrical power.

The present system may be used to slow shaft rotation after engine shutdown. As mentioned above, an AGB-less engine like that of FIG. 1 tends to rotate longer than a similar engine having an AGB, because of the reduced rotational inertia in the AGB-less engine. Upon engine shutdown, controller 40 may direct electricity (generated by one or more of machines 30, 32, or from any suitable source) to one or more of machines 30, 32 as described above to impede rotation and thereby decrease spin-down time.

In another aspect, controller 40 optionally communicates with an electrically-powered oil pump 44 of an engine oil system 46 communicating with bearings (not indicated) of the spools 20, 24. When high gust winds cause rotation velocity beyond pre-determined levels, for example, controller 40 can supply electrical power from one of both machine 30, 32 acting as generators, and/or from external source 42, to the electrically powered oil pump 44, to circulate sufficient oil within system 46 to protect the bearings from undue wear and vibration. Preferably, this lubrication is temporary only, and used in conjunction with a rotation-reduction scheme such as the one described above, and thus employed until the braking effect of the braking system reduces rotation velocity to a level where further lubrication action is not required.

Similarly, on engine shutdown, controller 40 ensures electrically-powered oil pump 44 of an engine oil system 46 communicating with bearings (not indicated) of the spools 20, 24 continues to operate, providing electricity generated from LSG and/ore ISG 30, 32, to circulate sufficient oil within system 46 to lubricate the bearings until shaft rotation speed has dropped below a threshold value.

The above description is meant to be exemplary only, and one skilled in the art will recognize that other changes may also be made to the embodiments described without departing from the scope of the invention disclosed as defined by the appended claims. For instance, any suitable machine configuration may be used, and is not limited to the example disclosed in the above examples. The machines connected to the spools need not necessarily function as a generator and motor. On one or all spools, the motor and generator functions can be provided by two or more electric machines connected to the same spool. Any number of spools may be provided on the engine, and any number of motors and/or generators may be associated therewith, and not all need to have the present concept associated therewith. The electric machine or machines are not necessarily coaxially mounted on a spool and can instead be located elsewhere, such as on an accessory gearbox (AGB), for instance. Although the illustrated gas turbine engine is a turbofan, the apparatus and method can be employed with a turboprop engine, and is not limited to application on aircraft engines. Although a motor is preferred for providing the braking action, any suitable braking apparatus may be employed, such as a dedicated brake system. Still other modifications will be apparent to the skilled reader which are intended to fall within the scope of the appended claims.

What is claimed is:

1. A ground windmill control apparatus for impeding windmilling rotation of a bladed rotor and an associated engine shaft of an aircraft-borne turbofan gas turbine engine, the apparatus comprising:
   at least one electric generator connected to rotate with the engine shaft
   at least one electric motor connected to rotate with the engine shaft
   a controller configured to be operable while the aircraft is on the ground and the engine is in an unlit shutdown mode to control the generator to operate as an electrical generator and to control the motor to operate as an electric motor to provide electrical power to the electric motor generated by the electric generator to apply a braking torque to the engine shaft opposite in direction to the direction of the windmilling rotation.

2. The apparatus as defined in claim 1, wherein the generator and the motor are provided in a single multi-channel electrical machine.

3. The apparatus as defined in claim 1, wherein the apparatus comprises:
   an electric motor-generator having a motor-generator rotor mechanically connected to rotate with the engine shaft, and a co-operating motor-generator stator having independently controllable first and second channels; and wherein
   the controller controls the first stator channel to operate as an electrical generator and controls the second stator channel to operate as an electric motor, wherein the first stator channel provides electrical power, to the second stator channel to apply a braking torque to the engine shaft opposite in direction to the direction of the windmilling rotation.

4. The ground windmill control apparatus according to claim 3 wherein the controller is operable to selectively control the first and the second stator channels to each operate independently as an electrical generator channel.

5. The ground windmill control apparatus according to claim 3 wherein the controller is operable to control the first and the second stator channels to each operate independently as an electrical motor channel to accept electrical power from an electrical power source external to the engine and to apply a braking torque to the motor-generator rotor opposite in direction to the direction of the windmilling rotation.

6. The ground windmill control apparatus according to claim 3 wherein the controller includes a rotation sensor in communication with the motor-generator rotor.

7. The ground windmill control apparatus according to claim 6 wherein the rotation sensor compares a measured rotary speed to one of: a predetermined initiate electric power speed; and a predetermined terminate electric power speed and wherein the controller controls the supply of electric power to the second channel depending on the compared speeds to apply the braking torque and to release the motor-generator rotor respectively.

8. The ground windmill control apparatus according to claim 7 wherein the controller includes an oil pump power supply capable of communication with an electrically driven oil pump of the engine to circulate lubricating oil to a shaft bearing when rotation above a predetermined start lubrication speed is sensed.

9. The ground windmill control apparatus according to claim 1 wherein the controller includes an electric power sensor in communication with the generator.

* * * * *